United States Patent [19]
Nicol

[11] Patent Number: 5,383,528
[45] Date of Patent: Jan. 24, 1995

[54] DRIVE SYSTEM HAVING A LINKAGE FOR CONTROLLING THE OPERATION OF GROUNDWHEELS IN A MOTOR VEHICLE

[76] Inventor: Alexander Nicol, 102-104 Dampier Street, Barellan Point, Queensland 4306, Australia

[21] Appl. No.: 12,155

[22] Filed: Feb. 1, 1993

[30] Foreign Application Priority Data

Jan. 30, 1992 [AU] Australia ............... PL0666

[51] Int. Cl.[6] .......................... B62D 11/02
[52] U.S. Cl. ................... 180/6.2; 180/210; 180/215; 180/216
[58] Field of Search ......... 180/210, 215, 216, 6.48, 180/6.24, 6.26, 6.2, 6.32, 6.62, 6.4; 280/771, 98

[56] References Cited

U.S. PATENT DOCUMENTS

| | | | |
|---|---|---|---|
| 3,362,493 | 1/1968 | Davis et al. | 180/6.32 |
| 3,504,493 | 4/1970 | Potter et al. | 180/6.48 |
| 3,550,708 | 12/1970 | Paramythioti | 180/6.48 |
| 3,612,199 | 10/1971 | Vissers | 180/6.32 |
| 4,293,050 | 10/1981 | Goloff et al. | 180/6.26 |
| 4,641,720 | 2/1987 | Young | 180/216 |

FOREIGN PATENT DOCUMENTS

137017  11/1950  U.S.S.R. ............... 180/6.48

Primary Examiner—Eric D. Culbreth
Attorney, Agent, or Firm—Chushman, Darby & Cushman

[57] ABSTRACT

A drive system (1) for a motor vehicle is disclosed. The drive system (1) includes left and right wheels (2,3) driven by left and right hydrostatic drive units (5,6), respectively. A rear wheel (4) is used to steer the motor vehicle. A linkage system including links (9,10,12) is used to connect or disconnect the drive units (5,6) to or from their respective wheels (2,3) when the steered rear wheel (4) calls for a direction of turning.

14 Claims, 9 Drawing Sheets

DRIVE SYSTEM HAVING A LINKAGE FOR CONTROLLING THE OPERATION OF GROUNDWHEELS IN A MOTOR VEHICLE

BACKGROUND

The present invention relates to drive systems, and in particular, to a drive system for a ride-on lawn-mower.

Existing ride-on tractor machines such as ride-on mowers use either a single hydrostatic unit driving a differential, as in a rear wheel drive motor vehicle with normal geometric steering, or two hydrostatic drive units each controlled by a separate hand lever, as is done in steering a caterpillar tractor with no geometric steering, only jockey or castor wheels.

It has been found that these existing drive systems for ride-on mowers create steering and traction problems when the ride-on mower encounters sand, soft ground, wet grass or sloping ground.

It is believed that the use of geometric steering is of importance to a ride-on mower as this enables the operator to manipulate or steer the ride-on mower around obstacles such as trees and the like when mowing grass.

It is therefore, an object of the present invention to provide a drive system which substantially overcomes or ameliorates the above mentioned disadvantages by the provision of a mix between geometric steering and independent drive.

SUMMARY OF THE INVENTION

According to one aspect of the present invention there is disclosed a drive system for a motor vehicle which comprises a drive means, at least two ground engaging drive wheels each of which is able to be independently driven by said drive means, a geometrically steerable ground engagable wheel, and a linkage means which links said geometrically steerable wheel with said drive wheels, wherein said linkage means operates to accomplish either or both of the following functions:

(i) to dis-connect the drive means with one of said drive wheels when the geometrically steerable wheel is manouvered into a direction for turning of the vehicle, and (ii) to connect the drive means with said drive wheels to drive said drive wheels in rotationally opposite directions when the geometrically steerable wheel is manouvered into a minimum turning circle.

One embodiment of the present invention will now be described with reference to the drawings in which:

Figure 1:
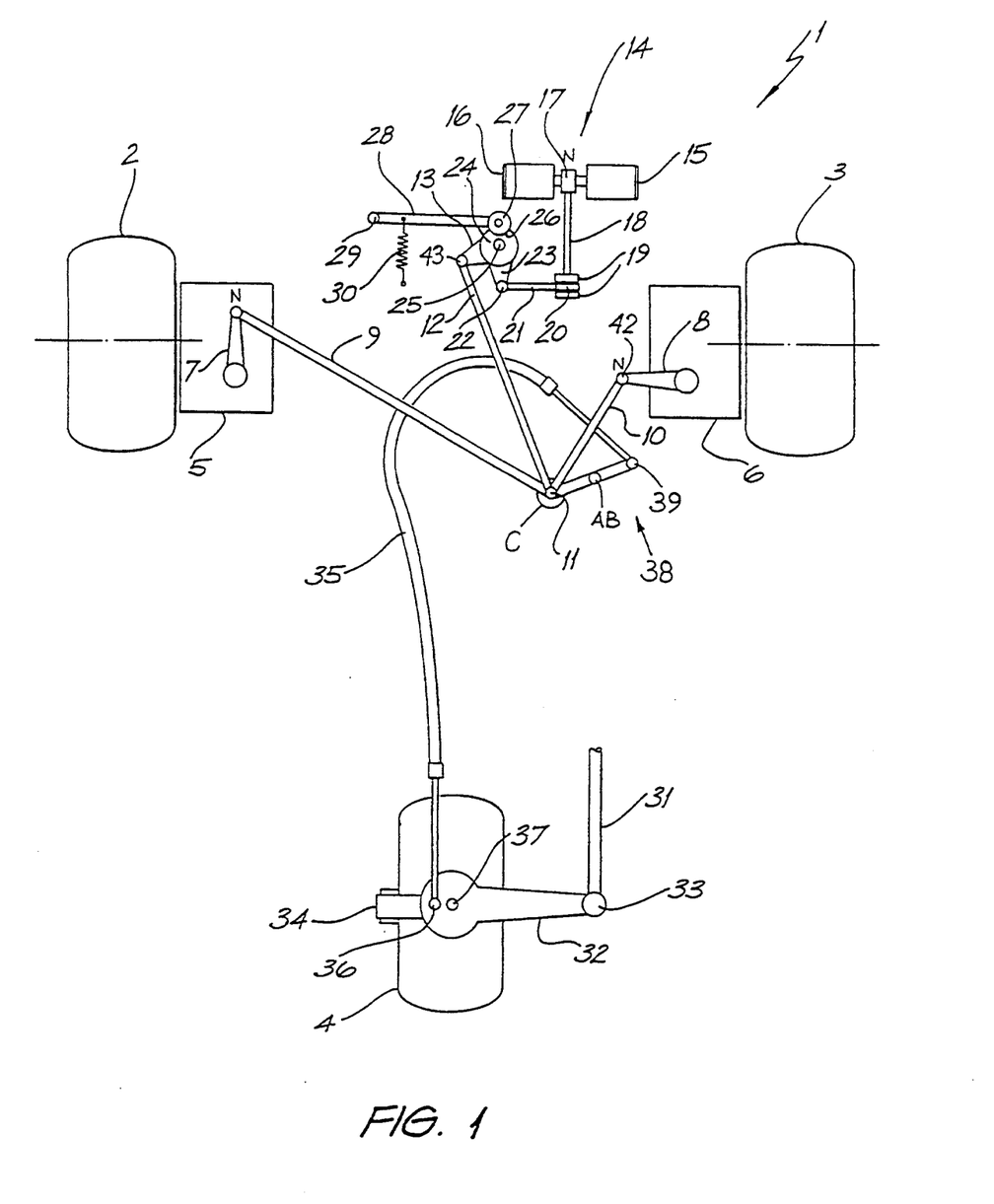
FIG. 1 is a schematic diagram of the drive system of the preferred embodiment illustrating the system in a neutral condition.

The drive system 1 of the preferred embodiment includes a left drive wheel 2, a right drive wheel 3 and a rear wheel 4 which is able to be turned for steering of the vehicle (not illustrated).

The left drive wheel 2 and right drive wheel 3 have a left hydrostatic drive unit 5 and right hydrostatic drive unit 6 respectively. The hydrostatic drive units 5 and 6 are conventional and have forward, neutral and reverse configurations.

The hydrostatic drive units 5 and 6 have pawls 7 and 8 respectively. Connected to the pawls 7 and 8 by pins 41 and 42 are links 9 and 10. The other ends of the links 9 and 10 are joined by a pin 11. Also connected via the pin 11 to the links 9 and 10 is one end of another link 12 which has its other end connected to a forward/reverse selection apparatus 14, by a pin 43.

The apparatus 14 includes a forward pedal 15 and a reverse pedal 16 which are pivoted about a fixed pedestal 17. A shaft 18 which is rotatably connected at one end to the fixed pedestal 17 is therefore rotatable when the forward pedal 15 and reverse pedal 16 are pivoted about the fixed pedestal 17. Connected at the other end of the shaft 18 is a pair of cam plates 19 which has a disc 20 located therebetween. As the shaft 18 is rotated, the cam plates 19 are also rotated as is the disc 20 between the cam plates 19. A link 21 is connected at one end to the disc 20 and at the other end, via a pin 22, to an arm 23. The arm 23 is fixedly connected to a disc 24 which rotates around a fixed pin 25. The disc 24 has a detent 26 into which a smaller disc 27 fits. The disc 27 is rotatably mounted at one end of a lever 28 pivoted at its other end about a fixed pin 29. A coil spring 30 ensures that the disc 27 engages the detent 26 when they are aligned.

The rear wheel 4 which is used to steer the motor vehicle has a steering linkage arm 31 which is essentially conventional and shown in a cutaway fashion. The steering linkage arm 31 is connected to a conventional steering wheel (not illustrated) or an equivalent. The linkage arm 31 is connected to a pivotable arm 32 by a pin 33. The arm 32 is connected by a pin 37 to the axle linkage 34 of the rear wheel 4 to steer same. Connected to the rotatable arm 32 is a push-pull cable 35 which is connected to the arm 32 via a pin 36 located adjacent the pin 37. As the arm 32 is pivoted, the push-pull cable 35 is manipulated as the relative position of the pin 36 changes. The other end of the push-pull cable 35 is connected to a linkage assembly 38 which is illustrated in more detail in FIG. 9. The cable 35 is connected to the linkage assembly 38 via a pin 39.

Figure 9:
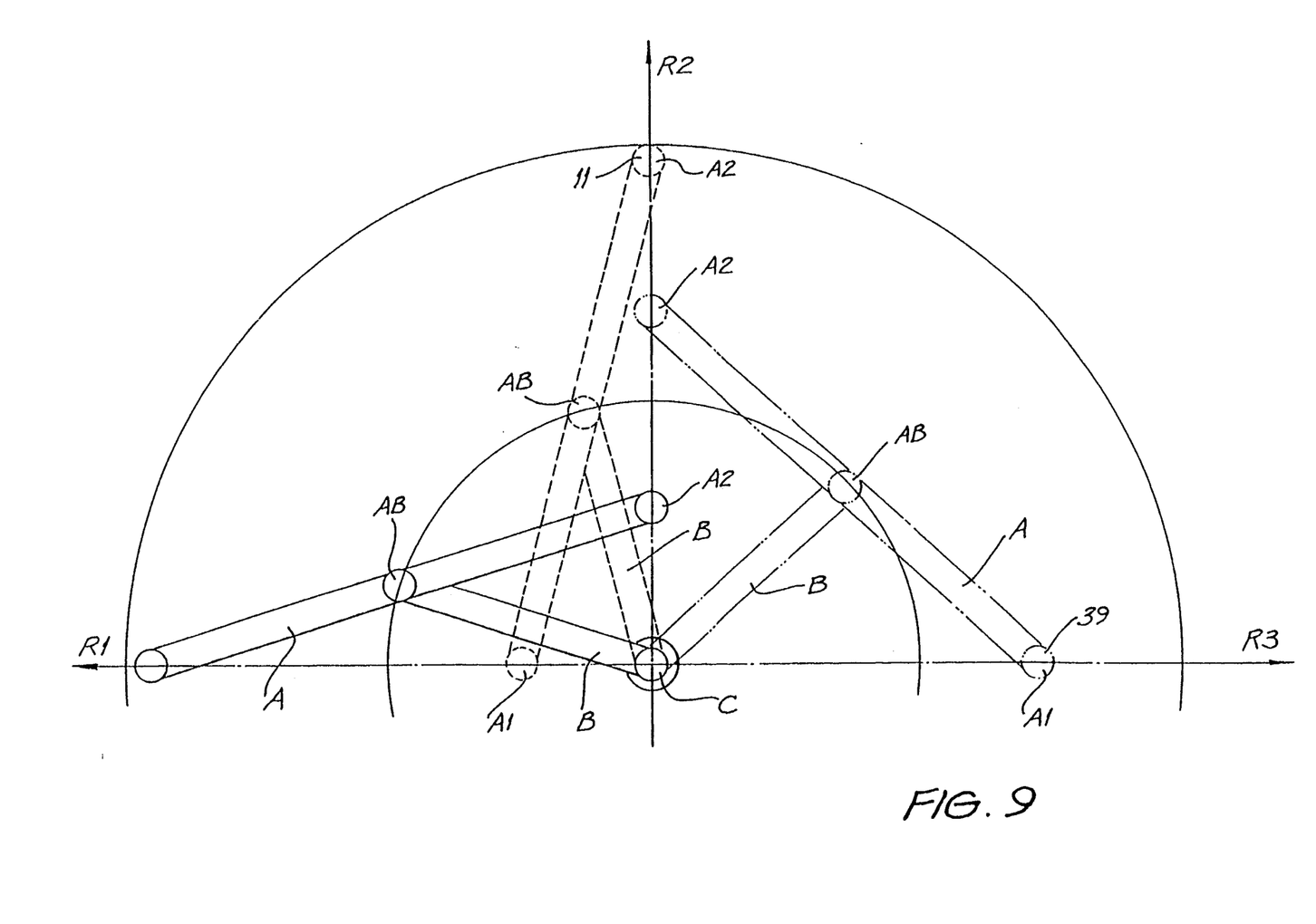
FIG. 9 is a schematic plan view of the lever arrangement of the system of FIG. 1.

The linkage assembly 38 includes two arms A and B. The arm B is half the length of arm A and has one end connected to the centre of arm A at the pivot axis AB. The arm B pivots at its other end about a fixed pivot point C. A pin connect the arms A and B together at pivot axis AB.

The arms A and B are used to manipulate the links 9 and 10 according to requirements of the pedal apparatus 14. One end A1 of arm A which carries pin 39 is able to be moved along radius R1/R3 from the pivot point C for a distance no greater than the length of arm A. The other end of arm A carries pin 11.

As the A1 end of arm A moves along the radius R1/R3, the other end A2 of arm A will travel along another radius R2 which is perpendicular to the radius R1/R3 and extends from the pivot point C for a distance equal to the length of arm A. Radii R1 and R3 always are perpendicular to radius R2 and are always opposite to each other. The axes of the pivot points are vertical and the arms A and B pivot in a horizontal plane.

Figure 2:
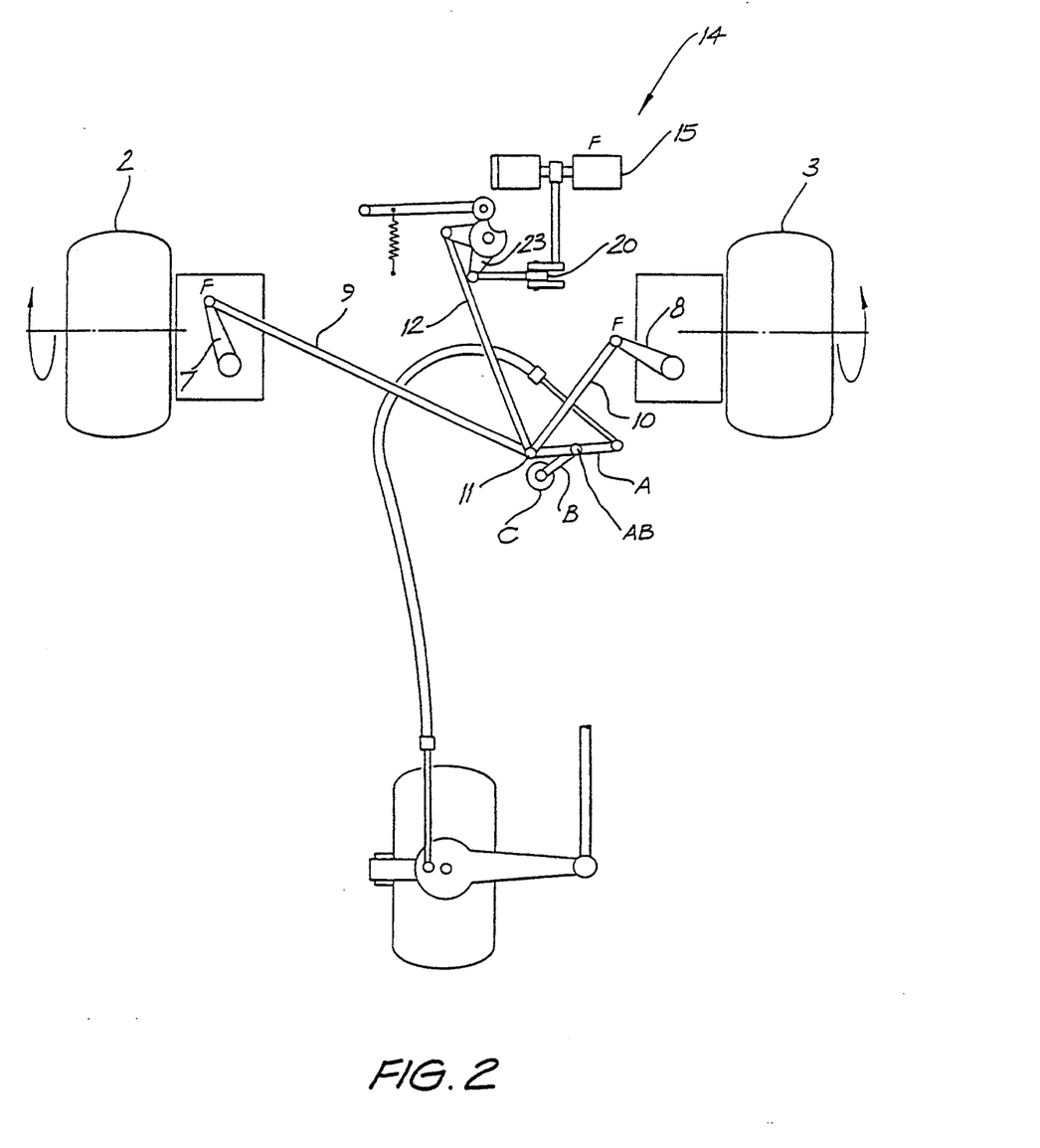
FIG. 2 shows the drive system of FIG. 1 illustrating the system in a forward condition.
Figure 3:
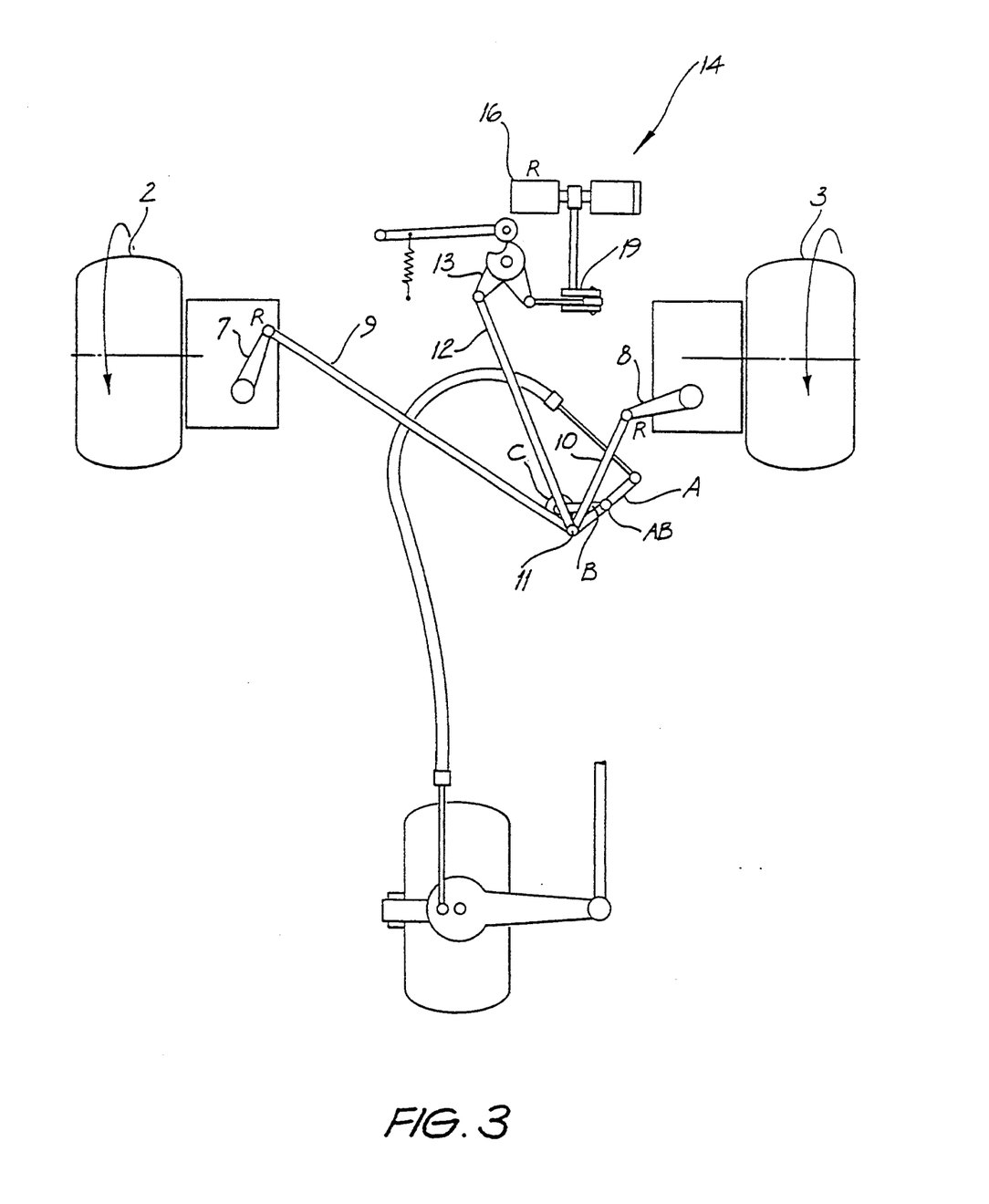
FIG. 3 shows the system of FIG. 1 in a reverse condition.

For the description of the operation of the drive system 1, it is seen that FIGS. 1-3 illustrate the drive system where there is no steering of the rear wheel 4. Illustrated in FIG. 1, the drive system 1 is in a neutral configuration. The pawls 7 and 8 are illustrated in a position where the hydrostatic drive units 5 and 6 are not engaged.

The pedal apparatus 14 is shown where both pedals 15 and 16 are not engaged by the user, and therefore the disc 27 of the lever 28 is engaged with the detent 26 of the disc 24. The arms 23 and 13 are illustrated in their neutral configuration with the links 12, 9 and 10 also illustrated in the neutral configuration. In this neutral configuration, the end A1 of the arm A carrying pin 11 is positioned vertically above pivot point C. Therefore both arms A and B lie along radius R2.

When the drive system 1 is moved into a forward condition, the forward pedal 15 is depressed which in turn rotates shaft 18 about the fixed pedestal 17. The rotation of shaft 18 also rotates the cam plates 19 and the position of the disc 20 is altered. In this case, the disc 20 is moved to the left as illustrated in FIG. 2. The link 21 moves the arm 23 which then in turn rotates the disc 24. At this time, the disc 27 rotates out of the detent 26. The arm 23 also is moved to its configuration in FIG. 2, which in turn moves the link 12 which is connected to the pin 11. The movement of link 12 moves the links 9 and 10 which in turn move the pawls 7 and 8 into the forward configuration. Both the hydrostatic drive units 5 and 6 are therefore engaged and the wheels 2 and 3 are likewise engaged to move the vehicle in a forward direction.

If the forward pedal 15 is allowed to return to the neutral position, the disc 27 re-engages the detent 26 to allow the apparatus 14 to remain in neutral.

For the reverse condition, as illustrated in FIG. 3, the reverse pedal 16 is depressed, which similarly rotates the shaft 18 about the fixed pedestal 17. This rotation, however, is in the opposite direction which causes the cam plates 19 to rotate in an opposite direction to that described previously with regard to the forward configuration. The position of the disc 20 between the cam plates 19 is moved to the right as illustrated in FIG. 3, and therefore the link 21 connected to the arm 23 rotates the disc 24 in an anticlockwise direction. This once again rotates the disc 27 out of engagement with the detent 26. Via the arm 13, the link 12 is moved which in turn changes the positions of the links 9 and 10. The pawls 7 and 8 are therefore moved into the reverse position which engages the hydrostatic drive units 5 and 6 and hence the drive wheels 2 and 3 to propel the motor vehicle in a reverse direction. Once again, if the reverse pedal 16 is allowed to return to its neutral position, the disc 27 re-engages the detent 26 and therefore the apparatus 14 is in the neutral configuration as illustrated in FIG. 1.

Figure 4:
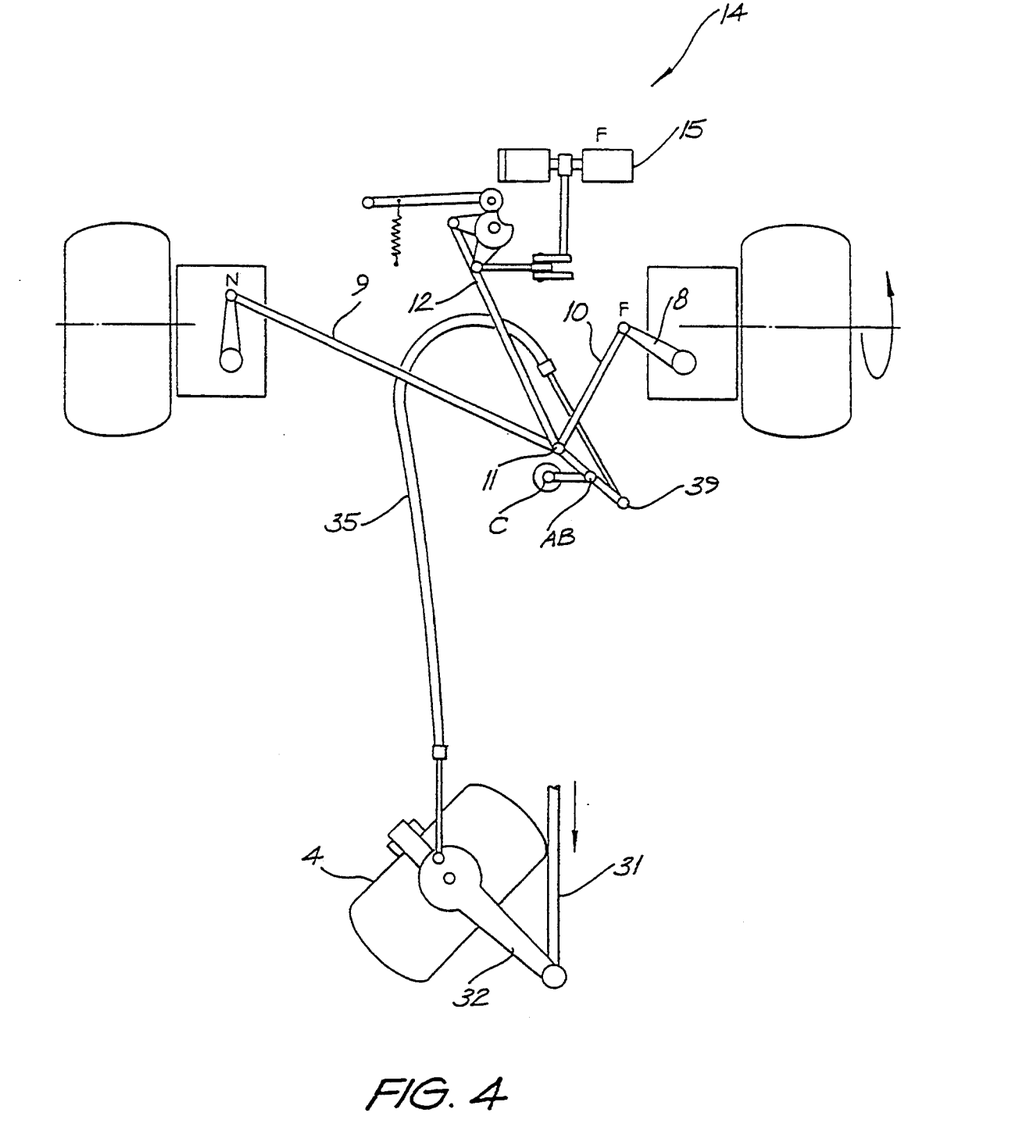
FIG. 4 shows the system of FIG. 1 in a forward-left turn condition.

For a forward-left turn configuration as illustrated in FIG. 4, the forward pedal 15 is depressed which rotates the disc 24 in a clockwise direction as previously described. This has the effect that the link 12 is moved accordingly. However, with the rear wheel 4 turned in a clockwise direction by the steering linkage arm 31 as illustrated in FIG. 4 in order that the motor vehicle turn left, the push-pull cable 35 has the effect that the arm A is moved by the cable 35 as well as by the link 12. The push-pull cable 35 forces the position of arms A and B to change. In this configuration, the link 9 does not move the pawl 7 and the left wheel 2 remains in neutral. The link 10 changes the position of the pawl 8 into the forward position which engages the hydrostatic drive unit 6 of the right wheel 3. In this case, when the vehicle is turning left when in a forward direction, only the right wheel 3 is driven.

Figure 5:
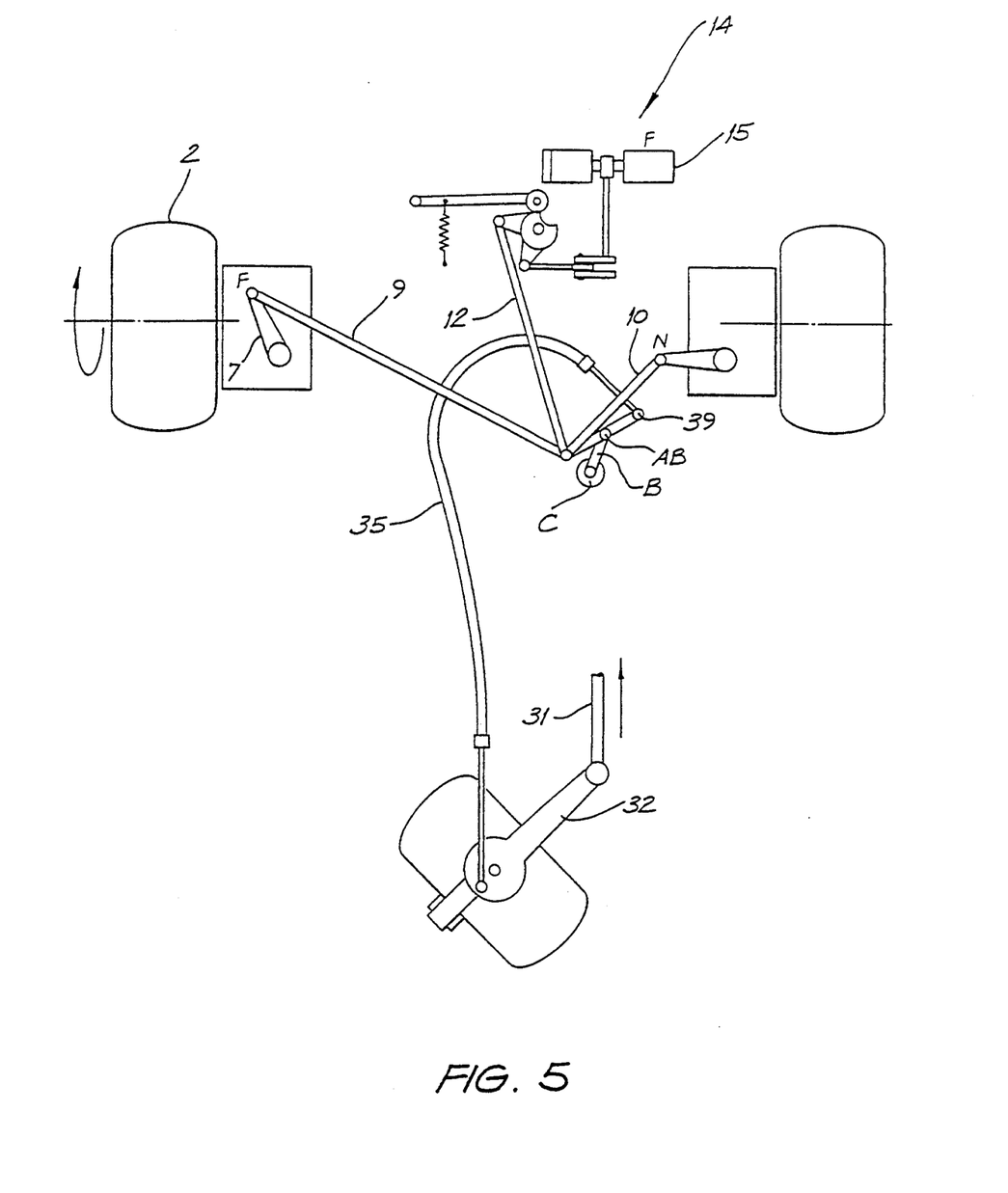
FIG. 5 shows the system of FIG. 1 in a forward-right turn condition.

In the forward-right turn configuration as illustrated in FIG. 5, the forward pedal 15 is depressed as described previously which rotates the disc 24 in a clockwise direction. This manipulates the link 12 as required. However, the steering linkage arm 31 turns the rear wheel 4 in a anticlockwise direction as illustrated in FIG. 5, and this in turn manipulates the push-pull cable 35 which changes the position of the steering linkage assembly 38. The link 9 therefore moves the pawl 7 as indicated in FIG. 5 to the forward position whereby the hydrostatic drive unit 5 is engaged and the left wheel 2 is driven by the drive system. The link 10 does not manipulate the pawl 8 and therefore the right wheel 3 remains in its neutral position. Therefore, when the motor vehicle is going in a forward direction and the rear wheel 4 is turned to turn the vehicle right, only the left wheel 2 is engaged while the right wheel 3 is in neutral.

Figure 6:
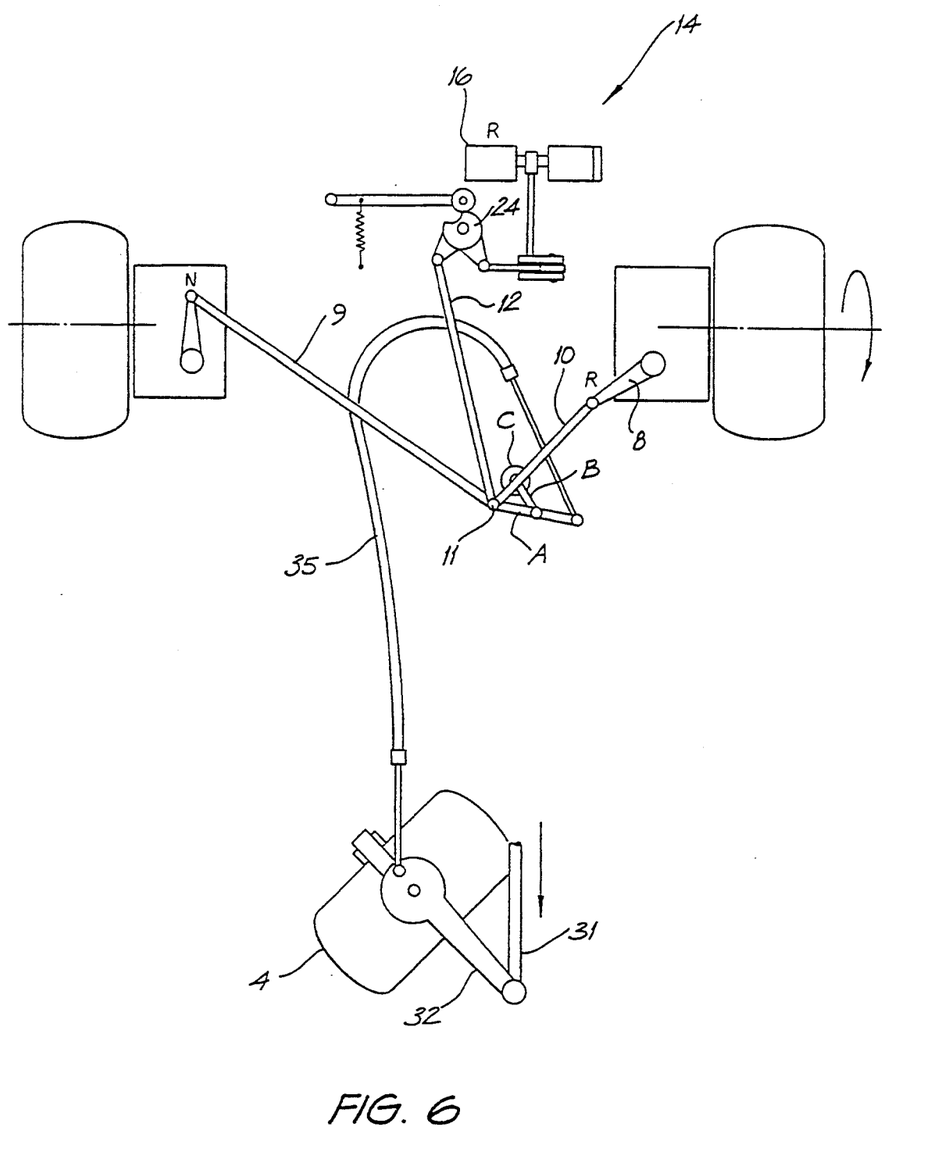
FIG. 6 shows the system of FIG. 1 in a reverse-left turn condition.
Figure 7:
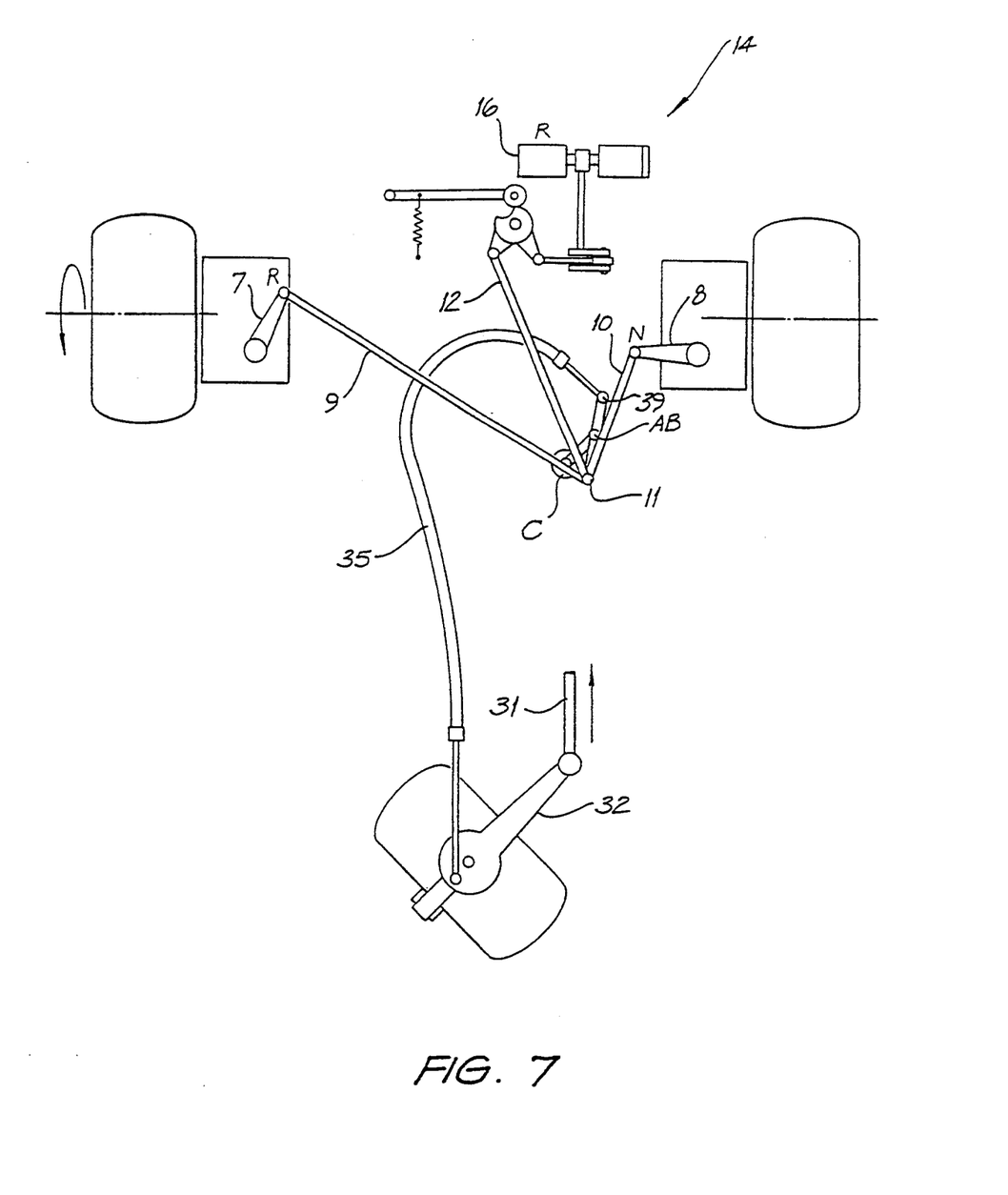
FIG. 7 shows the system of FIG. 1 in a reverse-right turn condition.

The configurations of reverse-left turn and reverse-right turn as illustrated in FIGS. 6 and 7 respectively are operated in a similar manner as previously described.

Figure 8:
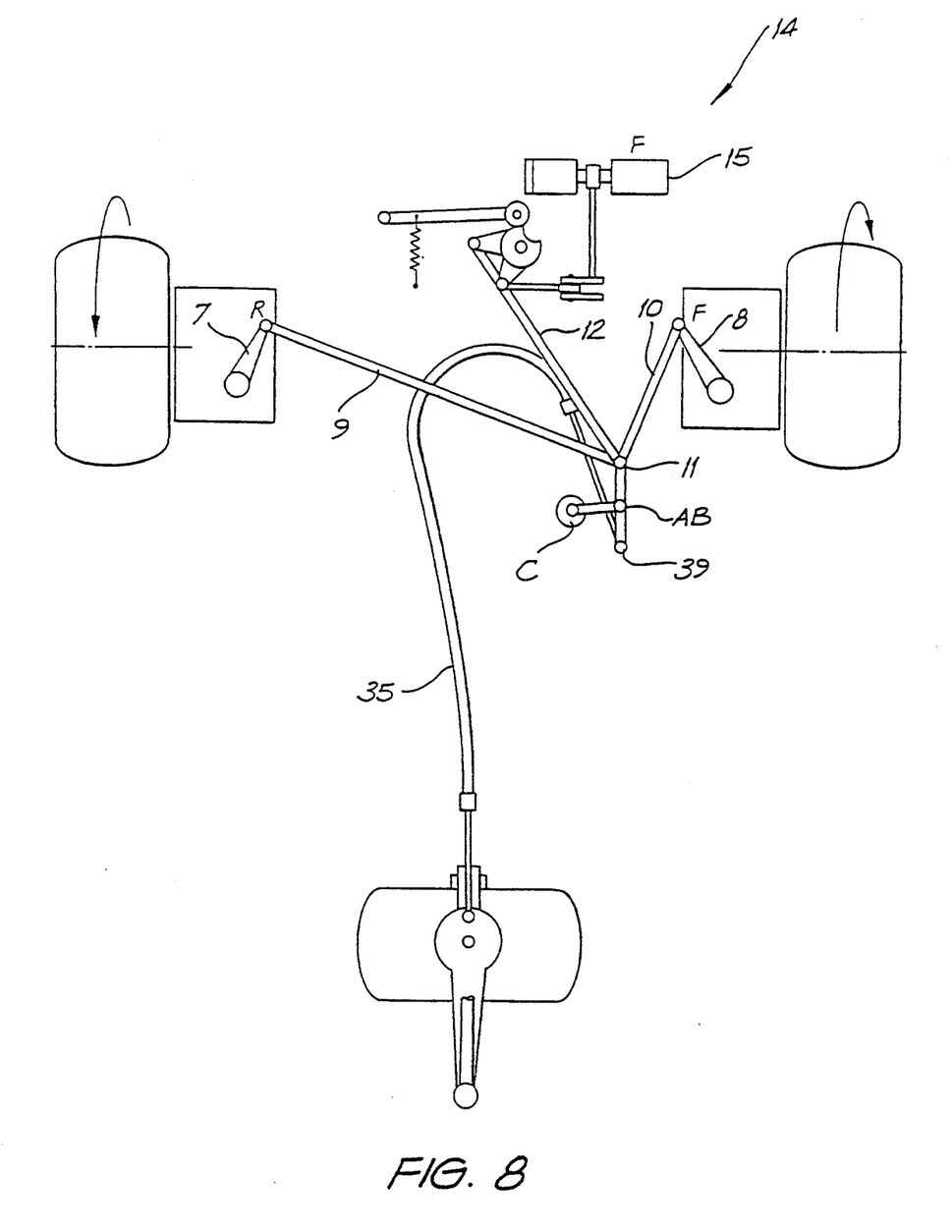
FIG. 8 shows the system of FIG. 1 in a forward-left pivot condition.

With regard to the forward-left pivot configuration as illustrated in FIG. 8, when the rear wheel 4 is positioned as shown in FIG. 5, the push-pull cable 35 changes the position of the linkage assembly to the position as illustrated. With the forward pedal 15 depressed, the link 12 is manipulated as illustrated. The combination of the link 12 and the push-pull cable 35 moves the links 9 and 10 to a position whereby the pawl 7 is moved into a reverse position while the pawl 8 is moved into a forward position. In this configuration, the left wheel 2 is driven in a reverse direction while the right wheel 3 is driven in a forward direction. In this case where both wheels 2 and 3 are moving in opposite directions, the turning circle is at a minimum being substantially equal to the length of the vehicle. This is of substantial advantage for lawn mowing.

As described above, with the manipulation of the independent hydrostatic drive units 5 and 6 together with the rear wheel 4, which is turned by a geometric steering system, the vehicle can overcome the steering and traction problems in relation to sand, soft ground, wet grass and sloping surfaces.

The foregoing describes only one embodiment of the present invention, and modifications obvious to those skilled in the art can be made thereto without departing from the scope of the present invention.

I claim:

1. A drive system for a motor vehicle comprising:
    drive means;
    at least two ground engaging drive wheels each of which is capable of being independently driven by said drive means;
    a steerable groundwheel capable of being turned to direct a path of travel of said vehicle;

and linkage means for linking said steerable groundwheel with said drive wheels, said linkage means including a linkage assembly having first and second arms, said first arm having a length which is half of a length of said second arm, said first arm having one end thereof connected to a center of said second arm and another end thereof connected to a fixed pivot, said first arm being pivotable about its connection with the center of the second arm and said second arm being pivotable about the fixed pivot in response to movement of a steering coupling connected to said steerable groundwheel, said linkage means being operable to (i) functionally disengage the drive means with one of said drive wheels when the steerable groundwheel is positioned to turn said vehicle in a predetermined turning radius, said predetermined turning radius being greater than a minimum turning radius of said vehicle, and (ii) to functionally engage the drive means with said drive wheels to drive said drive wheels in rotationally opposite directions when the steerable groundwheel is positioned to turn said vehicle in said minimum turning radius.

2. The drive system according to claim 1, wherein said second arm is pivoted about the said first arm by said movement of said steering coupling, and said first arm being pivotable about the fixed pivot.

3. The drive system according to claim 2, wherein said linkage means includes a link member from said steering coupling to one end of said second arm, said link member being capable of pivoting said second arm.

4. The drive system according to claim 3, wherein another end of said second arm is connected to said drive means.

5. The drive system according to claim 4, wherein said drive means includes at least two independent drive units, each of said drive units functioning to drive a respective one of said independent drive wheels.

6. The drive system according to claim 5, wherein each said drive unit is operatively engageable with its respective drive wheel by pivoting of said linkage means.

7. The drive system according to claim 6, wherein said drive means includes a selection apparatus for selecting between a forward and reverse mode of operation of said vehicle, said selection apparatus being linked to said second arm to enable said drive units to drive said drive wheels by pivoting of said linkage means.

8. A drive system for a motor vehicle comprising:
a drive assembly;
at least two ground engaging drive wheels each capable of being independently driven by said drive assembly;
a steerable groundwheel capable of being turned to direct a path of travel of said vehicle;
a steering coupling connected to said steerable groundwheel; and
a linkage assembly for linking the steerable groundwheel to the drive wheels, said linkage assembly including first and second arms, said first arm being smaller than said second arm and having one end thereof pivotally connected to said second arm generally at a center portion of said second arm, said first arm having another end thereof connected to a fixed pivot, said arms being pivotally movable in response to movement of said steering coupling so as to enable:

(i) said drive assembly to be functionally disengaged from one of said drive wheels when the steerable groundwheel is positioned to turn said vehicle in a predetermined turning radius, said predetermined radius being greater than a minimum turning radius of said vehicle, and (ii) said drive assembly to be functionally engaged with both said drive wheels to drive said drive wheels in rotationally opposite directions when the steerable groundwheel is positioned to turn said vehicle in said minimum turning radius.

9. The drive system according to claim 8, wherein said second arm is pivoted about the said first arm by said movement of said steering coupling, and said first arm being pivotable about the fixed pivot.

10. The drive system according to claim 9, wherein said linkage assembly includes a link member extending from said steering coupling to one end of said second arm, said link member being capable of pivoting said second arm.

11. The drive system according to claim 10, wherein another end of said second arm is connected to said drive assembly.

12. The drive system according to claim 11, wherein said drive assembly includes at least two independent drive units, each of said drive units functioning to drive a respective one of said independent drive wheels.

13. The drive system according to claim 12, wherein each said drive unit is operatively engageable with the corresponding drive wheel by the pivoting of said linkage assembly.

14. The drive system according to claim 13, wherein said drive assembly includes a selection apparatus for selecting between a forward and reverse mode of operation of said vehicle, said selection apparatus being linked to said second arm to enable said drive units to drive said drive wheels by pivoting said linkage assembly.

* * * * *